(12) United States Patent
Niijima

(10) Patent No.: US 7,570,498 B2
(45) Date of Patent: Aug. 4, 2009

(54) SWITCHING POWER SUPPLY APPARATUS FOR CORRECTING OVERCURRENT DETECTION POINT BASED ON GRADIENT OF SWITCHING CURRENT

(75) Inventor: Tetsuya Niijima, Ota (JP)

(73) Assignee: Sanken Electric Co., Ltd. (JP)

( * ) Notice: Subject to any disclaimer, the term of this patent is extended or adjusted under 35 U.S.C. 154(b) by 365 days.

(21) Appl. No.: 11/671,488

(22) Filed: Feb. 6, 2007

(65) Prior Publication Data
US 2007/0183171 A1 Aug. 9, 2007

(30) Foreign Application Priority Data
Feb. 7, 2006 (JP) ............... 2006-029332

(51) Int. Cl.
  *H02H 7/122* (2006.01)
(52) U.S. Cl. .................. 363/21.09; 363/56.1
(58) Field of Classification Search .............. 363/21.01, 363/21.04, 21.09, 21.12, 21.17, 56.1, 97
See application file for complete search history.

(56) References Cited

U.S. PATENT DOCUMENTS 4,447,841 A * 5/1984 Kent ............... 361/18
5,812,383 A * 9/1998 Majid et al. ............. 363/21.05
5,828,558 A * 10/1998 Korcharz et al. ............ 363/20
5,892,665 A * 4/1999 Matsumoto et al. ........ 363/56.1
7,339,804 B2 * 3/2008 Uchida .................... 363/56.1
7,345,895 B2 * 3/2008 Zhu et al. ................. 363/21.12
7,391,629 B2 * 6/2008 Ryu et al. ................. 363/56.1

FOREIGN PATENT DOCUMENTS

JP  2004-343900  2/2004

* cited by examiner

*Primary Examiner*—Jeffrey L Sterrett
(74) *Attorney, Agent, or Firm*—Wood, Herron & Evans, LLP (57) ABSTRACT

A switching power supply apparatus has a switching device control circuit for performing overcurrent protection by controlling switching-on/off of a switching device, connected serially to a primary winding of a transformer, so as to make a voltage output from a rectifying and smoothing circuit, connected to a secondary winding of the transformer, have a specific value, and switching off the switching device when the electric current flowing through the switching device exceeds a value as an overcurrent detection point. This control circuit includes: a current variation measurement circuit for measuring a gradient of the electric current flowing through the switching device, based on a current measurement signal output from a circuit for measuring this electric current; and an overcurrent detection-point correction circuit for correcting the overcurrent detection point with respect to the electric current flowing through the switching device, based on a signal output from the current variation measurement circuit.

6 Claims, 8 Drawing Sheets

SWITCHING POWER SUPPLY APPARATUS FOR CORRECTING OVERCURRENT DETECTION POINT BASED ON GRADIENT OF SWITCHING CURRENT

BACKGROUND OF THE INVENTION

1. Field of the Invention

The present invention relates to a switching power supply apparatus (e.g., DC-DC converter), in particular, a switching power supply apparatus having a correction device applicable to a wide input-voltage range with respect to a function of protecting the switching power supply apparatus from overload (i.e., overcurrent).

Priority is claimed on Japanese Patent Application No. 2006-29332, filed Feb. 7, 2006, the content of which is incorporated herein by reference.

2. Description of the Related Art

Figure 7:
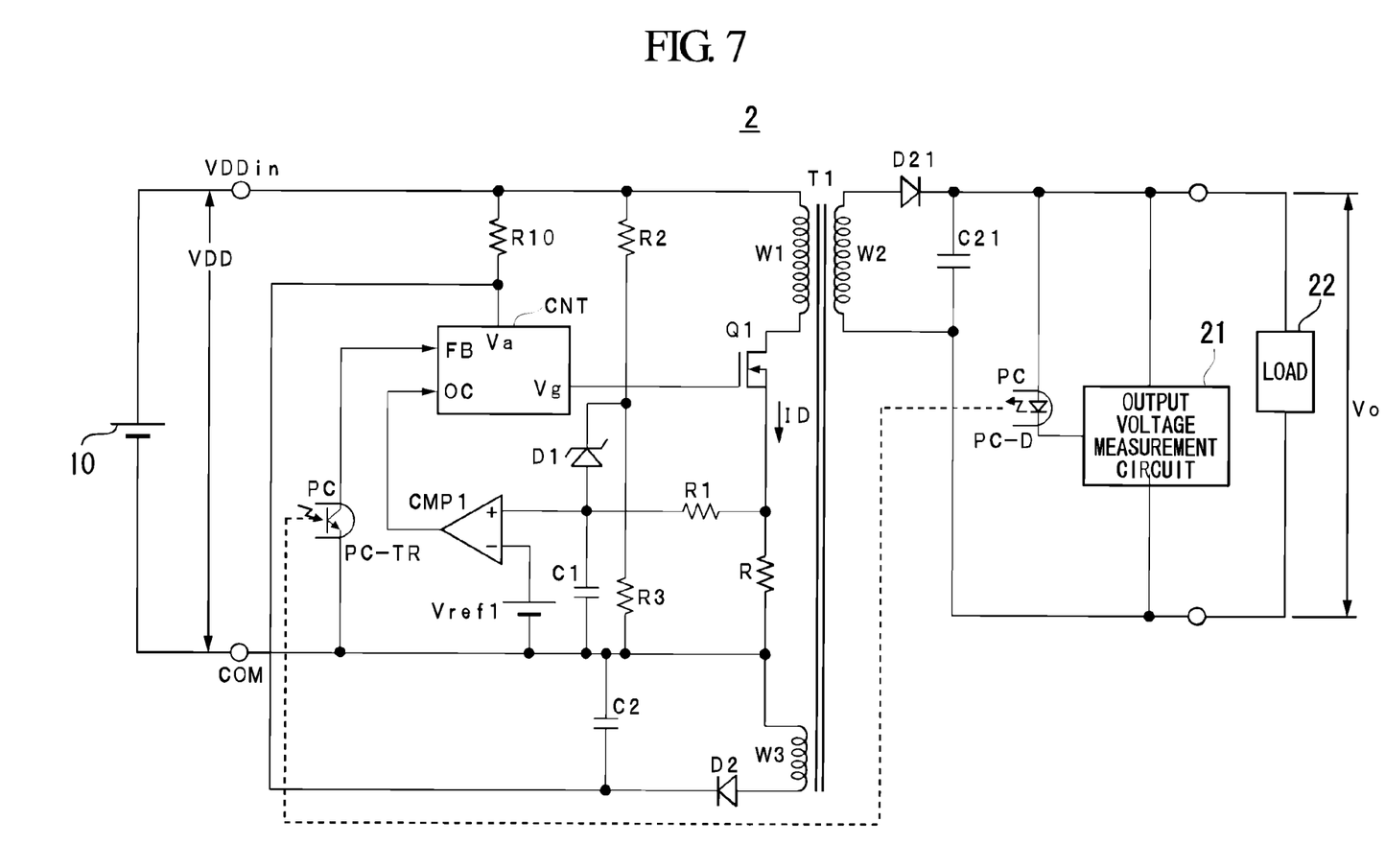
FIG. 7 is a diagram showing the structure of a conventional switching power supply apparatus.

FIG. 7 is a diagram showing an example of known switching power supply apparatuses (e.g., DC-DC converter), and an overload protection example thereof.

In a switching power supply apparatus 2 in FIG. 7, a DC (direct current) input voltage is applied between power supply terminals VDDin and COM by a DC power supply 10, and a primary winding W1 of a transformer T1, a switching device Q1, and an (electric) current measurement (or detection) resistor R are serially connected between the above power supply terminals VDDin and COM. Switching of the switching device Q1 is controlled by a control circuit CNT.

When the switching device Q1 is switched on, electric current flows in order of the DC power supply 10→the primary winding W1 of the transformer T1→the switching device Q1→the current measurement resistor R→the DC power supply 10. That is, the DC input voltage VDD (which may be simply called the "input voltage VDD" below) is applied to the primary winding W1 of the transformer T1, so that an exciting current having a triangle waveform flows through the primary winding W1 of the transformer T1 and magnetic energy is stored in the transformer T1.

The ON time of the switching device Q1 is determined by a feedback signal from a photocoupler PC. This feedback signal is an error signal obtained by measuring the output voltage Vo on a secondary (winding) side by using an output voltage measurement circuit 21, and comparing the measured voltage with a reference voltage. The feedback signal is transmitted from the secondary side via the photocoupler PC to the control circuit CNT on the primary (winding) side, thereby allowing control for maintaining a constant value of the output voltage Vo on the secondary side.

The photocoupler PC consists of a light emitting diode (LED) PC-D and a light receiving transistor PC-TR.

When the switching device Q1 is switched off, the magnetic energy stored in the transformer T1 is discharged from a secondary winding W2 thereof, via a rectifying diode D21 and a smoothing capacitor C21 to a load 22 on the output side.

A signal output from a tertiary winding W3 is smoothed by a diode D2 and a capacitor C2, and sent as a voltage signal to a terminal Va of the control circuit CNT. To this terminal Va, the input voltage VDD is applied via a resistor R10.

In order to perform overload (or overcurrent) protection, the switching power supply apparatus 2 in FIG. 7 has: the current measurement resistor R connected serially to the switching device Q1; a comparator CMP1 for detecting the overcurrent; and a reference voltage Vref1 provided also for detecting the overcurrent.

A current measurement signal provided by the current measurement using the current measuring resistor R is compared with the reference voltage Vref1 by the comparator CMP1, and when the current measurement signal exceeds the reference voltage Vref1, the comparator CMP1 outputs a disconnect signal for disconnecting (i.e., cutting off) the switching device Q1 to the control circuit CNT. When receiving the disconnect signal, the control circuit CNT outputs a low-level driving signal to a control terminal of the switching device Q1 so as to disconnect the switching device Q1.

However, a series of the above processes, executed from when the current measurement signal exceeds the reference voltage Vref1 to when the switching device Q1 is disconnected, has a slight delay. Accordingly, when the switching device Q1 is disconnected, the electric current which actually flows through the switching device Q1 is higher than that determined based on the reference voltage Vref1. When the input voltage VDD is low, the increase rate of the current which flows through the switching device Q1 is small; thus, the difference between the electric current determined by the reference voltage Vref1 and the electric current which is actually cut off (and is affected by the above delay) is small. However, when the input voltage VDD is high, the increase rate of the current which flows through the switching device Q1 is large; thus, the difference between the electric current determined by the reference voltage Vref1 and the electric current which is actually cut off is large.

As shown by the following formula, the output electric power Wo increases in proportion to the square of the electric current. Therefore, when the input voltage VDD increases, the electric current which is actually cut off increases, and thus the output electric current corresponding to the overcurrent also increases.

$$Wo=(1/2)L \cdot I^2 \cdot f$$

In the above formula, f indicates the switching frequency.

Figure 8:
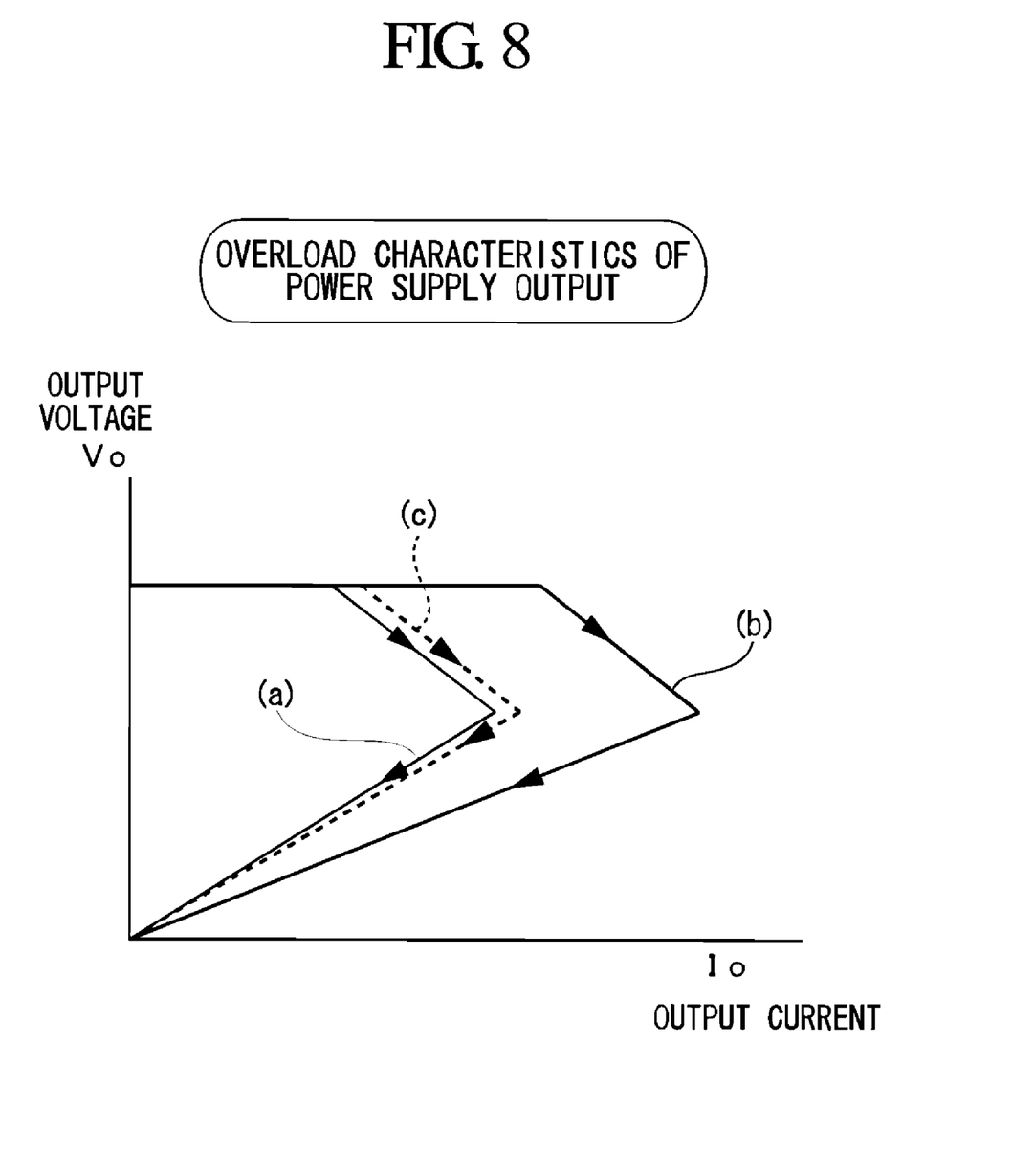
FIG. 8 is a diagram showing overload characteristics of the output from the conventional switching power supply apparatus.

Therefore, if it is assumed in the switching power supply apparatus that the overcurrent measurement value of the switching device Q1 be fixed, the output characteristics, obtained when the output on the secondary side falls in overload, considerably depend on the input voltage, as shown in FIG. 8, in which the line (a) is obtained when the input voltage is low, while the line (b) is obtained when the input voltage is high.

Consequently, when the input voltage is high, the output current is large; thus, a large stress due to such a current is imposed on the secondary winding and each element of the secondary rectifying circuit. With respect to each element on the primary side, (i) when the switching device Q1 is on, the peak current flowing through the switching device Q1 increases, and (ii) when the switching device Q1 is switched of, the surge voltage generated by the transformer increases due to the increased current, thereby imposing a large voltage stress on the switching device Q1. Therefore, an element having a high rating (with respect to the overcurrent, withstand voltage, and the like) should be employed, which causes an increase in the device size or the manufacturing cost.

In order to solve the above problem, a correction method with respect to the input voltage is known, in which when the input voltage VDD is high, a signal output from an input voltage measurement circuit is superimposed on the signal output from the current measurement circuit, so as to disconnect the switching device Q1 at a smaller overcurrent measurement value.

In the conventional example in FIG. 7, the input voltage VDD is measured using resistors R2 and R3, and a Zener diode D1 and a resistor R1 correspond to a correction circuit (using the input voltage VDD) for the overcurrent protection circuit. The correcting operation using the input voltage in the conventional example will be explained with reference to FIG. 7.

In the following explanation, "VR" indicates a voltage drop (i.e., inter-terminal voltage) of the current measurement resistor R and "VD1" indicates a breakdown voltage of the Zener diode D1. An input voltage VDD1 can be defined by a voltage division between the resistors R2 and R3 and the above breakdown voltage VD1, as follows:

$$VDD1=VD1\times(R2+R3)/R3$$

As a relationship "resistor R1>>resistor R" is generally effective, a voltage at the resistor R provided by the current which flows through the correction circuit (using the input voltage) can be disregarded.

When the input voltage VDD is larger than the above VDD1, a voltage drop VR1 is made to occur at the resistors R1 and R in accordance with the electric current determined by the input voltages VDD and VDD1, and the resistor R2.

That is, VR1 is added to the voltage drop VR of the current measuring resistor R. Therefore, with respect to the comparator CMP1 for detecting the overcurrent, when the input voltage VDD is high, the reference voltage Vref1 is reduced by a value corresponding to the voltage VR1. Accordingly, in the case of the high input voltage, the comparator CMP1 outputs the (switching device) disconnect signal when the current which flows through the switching device Q1 is smaller than that flowing through the switching device Q1 in the case of performing no correction. As a result, the output voltage corresponding to the overload does not depend on the input voltage. In FIG. 8, line (c) indicates characteristics independent on the input voltage, obtained when the correction with respect to the input voltage is applied.

However, this method requires an input voltage measurement circuit for measuring the input voltage VDD, and power consumption of this input voltage measurement circuit cannot be disregarded. In order to further solve this problem, another method for effectively using the tertiary winding of the transformer is known, in which the input voltage is measured using a voltage, which appears on the tertiary winding when the switching device is on, and which depends on the ratio of the primary winding to the tertiary winding, so as to perform the correction with respect to the input voltage (see, for example, Japanese Unexamined Patent Application, First Publication No. 2004-343900).

When a conventional correction method as described above is employed in an integrated circuit a problem occurs, caused by measuring the input voltage and superimposing it on the current measurement value (i.e., signal). More specifically, when the resistor R1 for correcting the input current is employed in an integrated circuit, two input terminal are necessary for the current measurement value and the input voltage correction value. If the correction resistor R1 is provided on the outside of the integrated circuit so as to omit the input terminals, the number of required external parts increases. Additionally, if the input voltage is directly measured, a voltage divider for measuring the input voltage is necessary. On the other hand, when the voltage on a winding of the transformer (i.e., the winding voltage) is measured, a diode is necessary for detecting the winding voltage when the switching device is on, which also increases an external part.

SUMMARY OF THE INVENTION

In light of the above circumstances, an object of the present invention is to provide a switching power supply apparatus having a simpler structure, for preventing the output current corresponding to the overcurrent from depending on the input voltage, without directly measuring the input voltage and increasing the number of external parts of the integrated circuit or the number of the terminals provided at the integrated circuit.

Therefore, the present invention provides a switching power supply apparatus comprising:

a transformer having at least a primary winding connected to a direct current power supply, and a secondary winding;

a switching device, connected serially to the primary winding of the transformer, for supplying an electric current from the direct current power supply to the primary winding of the transformer;

a current measurement circuit for measuring an electric current flowing through the switching device;

a rectifying and smoothing circuit connected to the secondary winding of the transformer; and a switching device control circuit for performing overcurrent protection by controlling switching-on/off of the switching device so as to make a voltage output from the rectifying and smoothing circuit have a specific value, and switching off the switching device when the electric current flowing through the switching device exceeds a value as an overcurrent detection point, wherein the switching device control circuit includes:

a current variation measurement (or detection) circuit for measuring a gradient of the electric current flowing through the switching device, based on a current measurement signal output from the current measurement circuit; and an overcurrent detection-point correction circuit for correcting the overcurrent detection point with respect to the electric current flowing through the switching device, based on a signal output from the current variation measurement circuit.

In accordance with the above structure, the level of the input voltage can be measured by measuring the electric current flowing through the primary winding of the transformer, and the gradient (i.e., increase rate) of this current. In accordance with the measured level of the input voltage, the overcurrent detection point used in the switching device control circuit is corrected. That is, with respect to the following relationship:

$$VDD=L1\times ID/t$$

where L1 indicates the inductance of the primary winding of the transformer, ID indicates the electric current flowing through the switching device, VDD indicates the input voltage, and t indicates the time, when it is assumed that the inductance L1 has a specific fixed value, the input voltage VDD can be measured by measuring the electric current of the switching device at a specific time, and measuring the gradient thereof.

Therefore, the overcurrent detection point can be corrected with respect to the input voltage, without measuring the input voltage directly or via a winding of the transformer. Accordingly, circuit elements, which should be added to the control part of the switching power supply apparatus, can be easily integrated in an integrated circuit; thus, the number of external parts of the integrated circuit, and electric power loss can be reduced, and it is unnecessary to add additional terminals for the correction to the integrated circuit.

In a typical example, the current variation measurement circuit has a device for measuring the gradient of the electric current flowing through the switching device based on a difference between a value of the electric current flowing through the switching device at a first time and a value of the electric current flowing through the switching device at a second time, wherein a specific time period from the first time to the second time is defined within a time period when the switching device control circuit outputs an on-signal to the switching device so as to switch on the switching device.

In accordance with this structure, within the on-period of the switching device (during which the electric current flowing through the switching device is increasing), the values of the electric current at the first time and the second time are measured, and the gradient of the electric current is measured based on the measured values. The level of the input voltage can be measured based on this gradient, so as to correct the overcurrent detection point in accordance with the input voltage.

Therefore, the overcurrent detection point can be corrected in accordance with the input voltage, without measuring the input voltage directly or via a winding of the transformer. Accordingly, circuit elements, which should be added to the control part of the switching power supply apparatus, can be easily integrated in an integrated circuit; thus, the number of external parts of the integrated circuit, and electric power loss can be reduced, and it is unnecessary to add additional terminals for the correction to the integrated circuit.

In a preferable example, the current variation measurement circuit has a device for:

determining whether the value of the electric current flowing through the switching device is smaller than a specific reference value when a predetermined time has elapsed after the switching device control circuit begins to output an on-signal to the switching device so as to switch on the switching device, and outputting a signal for correcting the overcurrent detection point when the value of the electric current is smaller than the specific reference value; and the overcurrent detection-point correction circuit has a device for increasing a reference value with respect to the overcurrent detection point by a predetermined value when receiving the signal for correcting the overcurrent detection point from the current variation measurement circuit.

In accordance with this structure, the predetermined time is measured using a timer or the like after the switching device control circuit begins to output the on-signal to the switching device, and it is determined whether the value of the electric current flowing through the switching device is smaller than the specific reference value when the predetermined time has elapsed. When the value of the electric current is smaller than the specific reference value, it can be determined that the gradient of the electric current is small (i.e., the input voltage is low), and the reference value with respect to the overcurrent detection point can be increased by a predetermined value.

Therefore, the overcurrent detection point can be corrected using a simple structure in accordance with the input voltage, without measuring the input voltage directly or via a winding of the transformer.

In another preferable example, the current variation measurement circuit has a device for measuring the gradient of the electric current flowing through the switching device by differentiating a waveform of the electric current flowing through the switching device at a time within a time period when the switching device control circuit outputs an on-signal to the switching device so as to switch on the switching device.

In accordance with this structure, the electric current flowing through the switching device can be differentiated so as to measure the gradient thereof and measure the input voltage based on the gradient. The overcurrent detection point can be corrected in accordance with the input voltage.

Therefore, the overcurrent detection point can be corrected in accordance with the input voltage, which can be measured only by differentiating the electric current flowing through the switching device, without measuring the input voltage directly or via a winding of the transformer. Accordingly, circuit elements, which should be added to the control part of the switching power supply apparatus, can be easily integrated in an integrated circuit; thus, the number of external parts of the integrated circuit, and electric power loss can be reduced, and it is unnecessary to add additional terminals for the correction to the integrated circuit.

Also in this case, preferably, said device for measuring the gradient of the electric current differentiates the waveform of the electric current when a predetermined time has elapsed after the switching device control circuit begins to output an on-signal to the switching device so as to switch on the switching device.

Accordingly, in order to measure the input voltage by differentiating the waveform of the electric current flowing through the switching device, counting of the predetermined time may be started simultaneously when the switching device is switched on, and the waveform of the electric current may be differentiated when the predetermined time has elapsed. Therefore, the waveform of the electric current can be differentiated without an influence of switching noise which occurs when the switching device is switched on.

DETAILED DESCRIPTION OF THE INVENTION

Hereinafter, embodiments as best modes in accordance with the present invention will be described with reference to the appended figures.

FIRST EMBODIMENT

Figure 1:
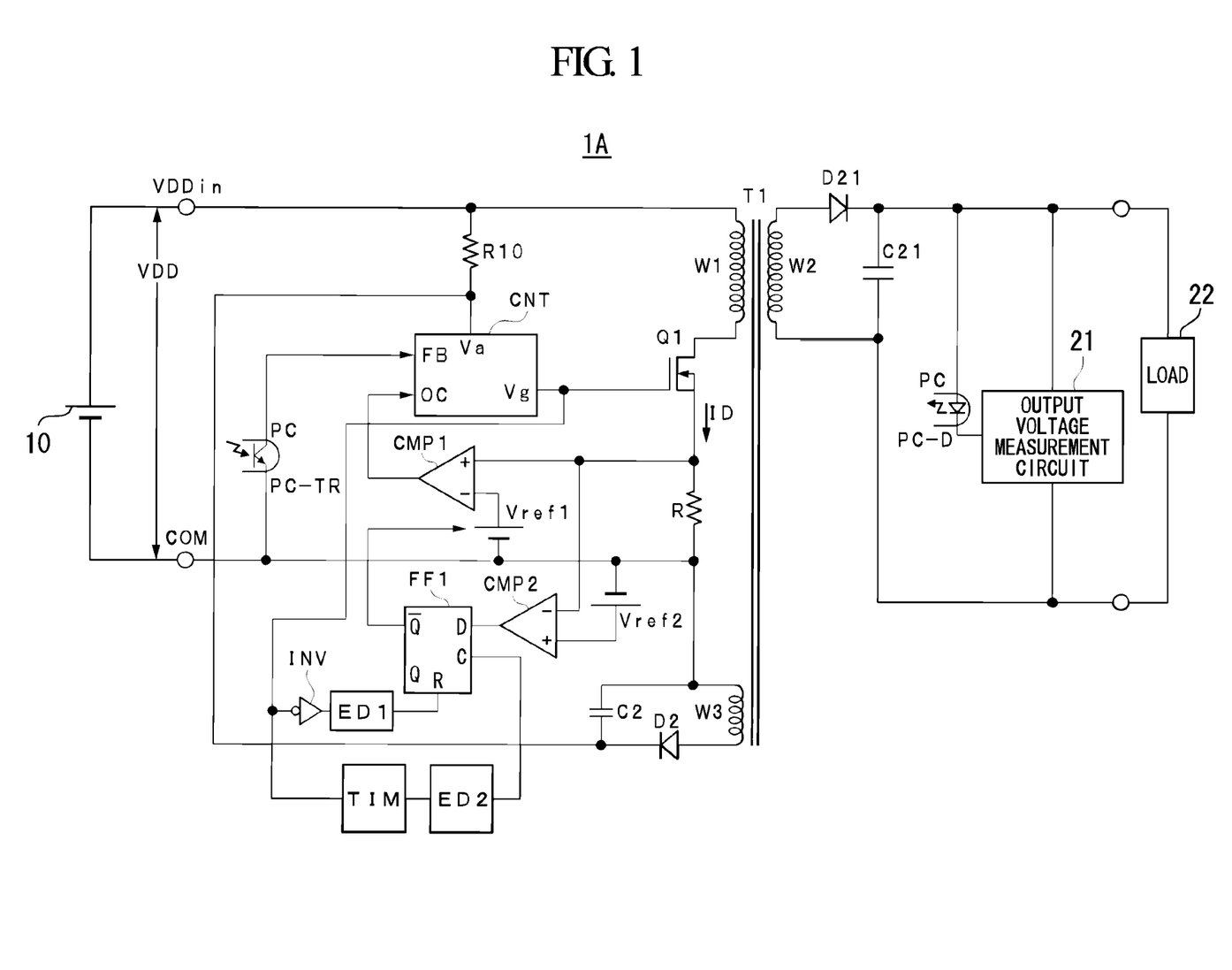
FIG. 1 is a diagram showing the structure of a first embodiment of the switching power supply apparatus in accordance with the present invention.

FIG. 1 is a diagram showing a first embodiment of the switching power supply apparatus in accordance with the present invention. In FIG. 1, parts corresponding to those in FIG. 7 are given identical reference numerals.

In a switching power supply apparatus 1A in FIG. 1, the gradient of the electric current (i.e., a current increase rate) flowing through the switching device is determined depending on whether the current value, measured when a specific time has elapsed after the current starts to flow through the switching device, is greater than or equal to a predetermined reference value, or less than this reference value. Based on the determination, the level of the input voltage is determined.

First, the principle of the input voltage measurement based on the gradient of the electric current flowing through the switching device will be explained.

In the switching power supply apparatus 1A in FIG. 1, an input voltage VDD is supplied from a DC power supply 10. Therefore, while the switching device Q1 is on, a switching current ID flows through the switching device Q1 via a primary winding W1 of a transformer T1. The switching current ID is measured as a voltage drop VR of a current measurement resistor R (VR=R×ID), and is input into a comparator CMP1 and another comparator CMP2. The comparator CMP1 is provided for measuring the overcurrent, while the comparator CMP2 is provided for measuring the input voltage.

A voltage VL1 applied to the primary winding W1 (having an inductance L) of the transformer T is defined as follows:

$$VL1=VDD-(RDS(ON)+R) \times ID$$

where "RDS(ON)" indicates the on-resistance of the switching device Q1.

Generally, the on-resistance RDS(ON) of the switching device and the resistance of the current measurement resistor R are small, and the relevant voltage (i.e., (RDS(ON)+R)×ID) is extremely small in comparison with the input voltage VDD, and thus it can be disregarded. In this case, the voltage VL1 applied to the primary winding W1 (of the inductance L) of the transformer T is defined by:

$$VL1=VDD$$

Accordingly, the electric current ID flowing through the switching device Q1 is defined by:

$$ID=VDD \times t/L1$$

where t indicates the time (second).

In accordance with the above formulas, the gradient (i.e., the increase rate) of the electric current ID of the switching device Q1 is in proportion to the input voltage, and in inverse proportion to the inductance L1 of the primary winding W1 of the transformer T1.

When transforming the latter formula, the input voltage can be defined by:

$$VDD=L1 \times ID/t$$

Therefore, when it is assumed that the inductance L1 has a specific fixed value, the input voltage VDD can be measured by measuring the electric current ID of the switching device Q1 at a specific time.

Next, the structure of the switching power supply apparatus 1A in FIG. 1 will be explained.

In FIG. 1, an end (or a terminal) of the current measurement resistor R is connected to a non-inverting input terminal (+) of the comparator CMP1 for measuring the overcurrent. A reference voltage Vref1, which is variable here, is supplied to an inverting input terminal (−) of the comparator CMP1.

The signal output from the comparator CMP1 is input into an overcurrent input terminal OC of a control circuit CNT which controls the ON/OFF operation of the switching device Q1 so as to adjust the output voltage applied to a load 22 to a specific voltage. When the signal is input into the terminal OC, the switching device Q1 is switched from the on state to the off state.

The above-described end of the current measurement resistor R is also connected to the inverting input terminal (−) of the comparator CMP2 so as to measure the gradient of the electric current which flows through the switching device Q1. Another reference voltage Vref2 to be compared with the electric current of the switching device Q1 is applied to the non-inverting input terminal (+) of the comparator CMP2. The signal output from the comparator CMP2 is supplied to an input terminal D of a flip-flop FF1. An output terminal Vg of the control circuit CNT is connected to a reset terminal R of the flip-flop FF1 via an inverter INV (i.e., logical inverting circuit) and an edge detection circuit ED1. The signal output from the edge detection circuit ED1 functions as the reset signal of the flip-flop FF1.

The output terminal Vg of the control circuit CNT is also connected to a clock input terminal C of the flip-flop FF1 via a timer TIM and an edge detection circuit ED2. The signal output from the edge detection circuit ED2 functions as a clock signal (i.e. a data latch signal) of the flip-flop FF1. An inverting output terminal "inverted-Q" of the flip-flop FF1 ("inverted Q" indicates a logically inverted signal of the signal Q) is connected to a control terminal with respect to the variable reference voltage Vref1. When an L-level (i.e., low level) signal is output from the terminal "inverted-Q", the value of the variable reference voltage Vref1 is changed (specifically, increased by ΔVref1).

Figure 2A:
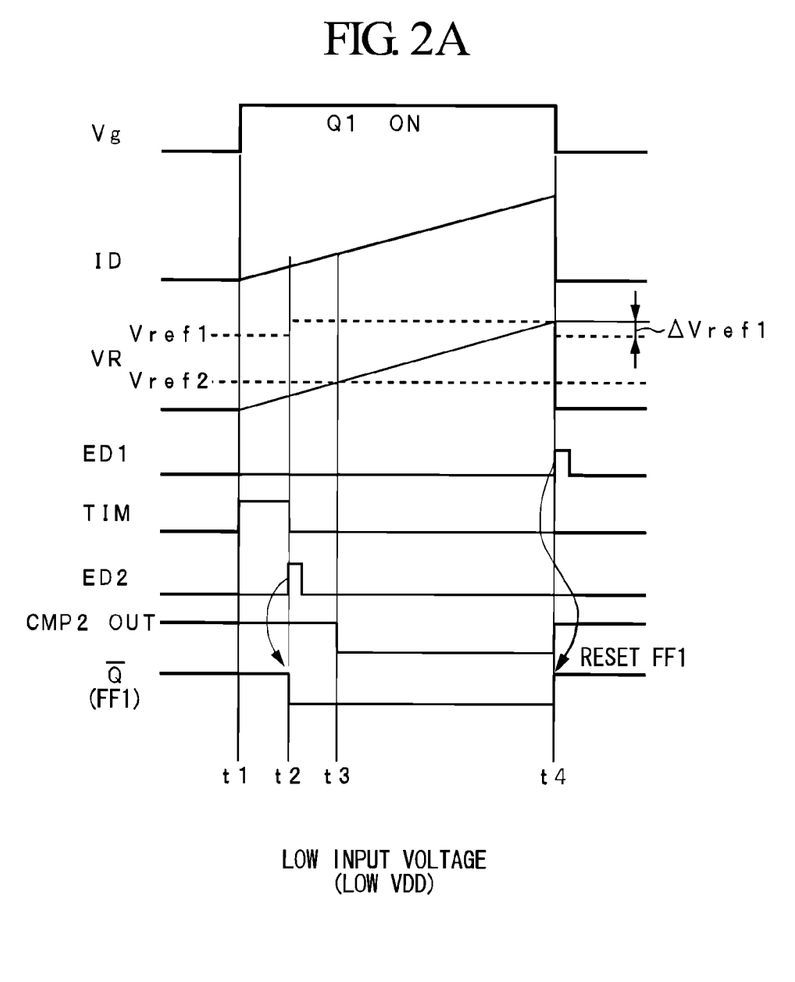
FIGS. 2A and 2B are diagrams for showing the operation of each element of the switching power supply apparatus in the first embodiment.
Figure 2B:
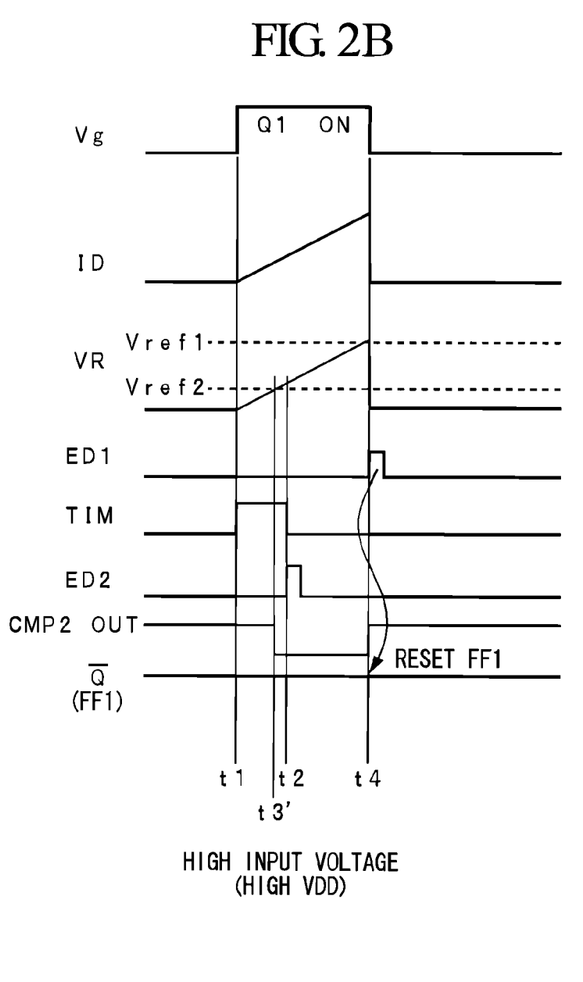

FIGS. 2A and 2B are diagrams for showing the operation of the switching power supply apparatus 1A when the input voltage is high or low. FIG. 2A shows the operation when the input voltage is low, while FIG. 2B shows the operation when the input voltage is high.

First, the operation performed when the input voltage is low will be explained with reference to FIG. 2A.

At time t1 in FIG. 2A, the signal output from the output terminal Vg of the control circuit CNT is set to a high level, so that the switching device Q1 is switched on, and the electric current begins to flow. An inter-terminal voltage VR of the current measurement resistor R is compared with the reference voltage Vref2 by the comparator CMP2. When the inter-terminal voltage VR is lower than the reference voltage Vref2, a high-level (H-level) signal is applied to the input terminal D of the flip-flop FF1. In addition, when the output terminal Vg of the control circuit CNT is set to the high level, the timer TIM starts to count the time.

When the counting of the timer TIM has been completed at time t2, the signal output from the timer TIM is switched from H level to L level (i.e., low level), and the edge detection circuit ED2 connected to the timer TIM detects that the signal output from the timer TIM has been switched from H level to L level, and outputs an edge detection pulse (signal). The edge detection pulse output from the edge detection circuit ED2 is input into the clock input terminal C of the flip-flop FF1.

In the case of the low input voltage, when the clock is applied as described above, a signal "CMP2out", which is output from the comparator CMP2 and is applied to the terminal D of the flip-flop FF1, is H level, that is, the H-level signal is input into the terminal D of FF1, and the output terminal "inverted-Q" of FF1 is set to L-level. When an L-level signal is supplied from the output terminal "inverted-Q" of FF1 to the control terminal with respect to the variable reference voltage Vref1, the variable reference voltage Vref1 is varied to a voltage higher than the original value by ΔVref1.

When the inter-terminal voltage VR exceeds the reference voltage Vref2 at time t3, the signal output from the comparator CMP2 is switched from H level to L level. At this time, no clock signal is applied to the flip-flop FF1, so that the signal output from FF1 does not change.

When the inter-terminal voltage VR of the resistor R (with respect to the current which flows through the switching device Q1) reaches Vref1 (which has been increased by ΔVref1) at time t4, the signal output from the comparator CMP1 is switched from L level to H level, so that an H-level signal is supplied to the terminal OC of the control circuit CNT. Accordingly, the output terminal Vg of the control circuit CNT is switched to L level, and the switching device Q1 is switched off. Also when the output terminal Vg of the control circuit CNT is switched to L level, the reset signal is input into the reset terminal R of FF1 via the inverter INV and the edge detection circuit ED1, so that the flip-flop FF1 is reset.

In accordance with the above processes, the input voltage VDD can be measured using the gradient of the switching current ID, and the overcurrent value can be corrected for each cycle terminated when the flip-flop FF1 is reset.

Next, the operation performed when the input voltage is high will be explained with reference to FIG. 2B.

At time t1 in FIG. 2B, the signal output from the output terminal Vg of the control circuit CNT is set High, so that the switching device Q1 is switched on, the electric current begins to flow, and the timer TIM starts to count the time.

The comparator CMP2 compares the inter-terminal voltage VR of the current measurement resistor R with the reference voltage Vref2. When the inter-terminal voltage VR is lower than the reference voltage Vref2, an H-level signal is applied to the terminal D of the flip-flop FF1.

When the inter-terminal voltage VR exceeds the reference voltage Vref2 at time t3', the signal output from the comparator CMP2 is switched from H level to L level.

When the counting of the timer TIM has been completed at time t2, the signal output from the timer TIM is switched from H level to L level, and the edge detection circuit ED2 connected to the timer TIM detects that the signal output from the timer TIM has been switched from H level to L level, and outputs the edge detection pulse. The edge detection pulse output from the edge detection circuit ED2 is input into the clock input terminal C of the flip-flop FF1.

In the case of the high input voltage, when the pulse is applied to the clock input terminal of the flip-flop FF1, the signal "CMP2out", which is output from the comparator CMP2 and is applied to the terminal D of the flip-flop FF1, is L level, that is, the L-level signal is input into the terminal D of FF1, and the output terminal "inverted-Q" of FF1 is maintained at H-level. Accordingly, the variable reference voltage Vref1 also does not change.

When the inter-terminal voltage VR (generated by the current which flows through the switching device Q1) of the resistor R reaches Vref1 at time t4, the signal output from the comparator CMP1 is switched from L level to H level, so that an H-level signal is supplied to the terminal OC of the control circuit CNT. Accordingly, the output terminal Vg of the control circuit CNT is switched to L level, and the switching device Q1 is switched off. Also when the output terminal Vg of the control circuit CNT is switched to L level, the reset signal is input into the reset terminal R of FF1 via the inverter INV and the edge detection circuit ED1, so that the flip-flop FF1 is reset.

In accordance with the above processes, the input voltage VDD can be measured using the gradient of the switching current ID, and the overcurrent value can be corrected for each cycle terminated when the flip-flop FF1 is reset.

In the first embodiment shown in FIG. 1, the current variation measurement (or detection) circuit of the present invention includes the current measurement resistor R, the reference voltage Vref2, and the comparator CMP2, and the overcurrent detection-point correction circuit of the present invention includes the flip-flop FF1 and the variable reference voltage Vref1.

SECOND EMBODIMENT

A second embodiment of the present invention will be explained below.

In the first embodiment, when a predetermined time has elapsed after the switching device Q1 is switched on and the current begins to flow though the switching device Q1, the current value of the switching device Q1 is compared with a reference voltage, so as to determine whether the gradient of the current (i.e., the current increase rate) is relatively large or small. When it is determined that the gradient of the current is small, the reference voltage Vref1 for detecting the overcurrent is varied (i.e., increased by ΔVref). That is, the first embodiment is an example of an overcurrent protection circuit which employs switching of the reference voltage Vref1 between two values. However, generally, switching between a plurality of values may be performed by providing a plurality of the reference voltages Vref2, the comparators CMP2, the flip-flops FF1, and the reference voltages Vref1. In addition, the reference voltage for measuring the overcurrent may be continuously varied in accordance with a variation in the input voltage.

In the second embodiment of the present invention, an example for continuously varying the reference voltage Vref1 will be explained.

Figure 3:
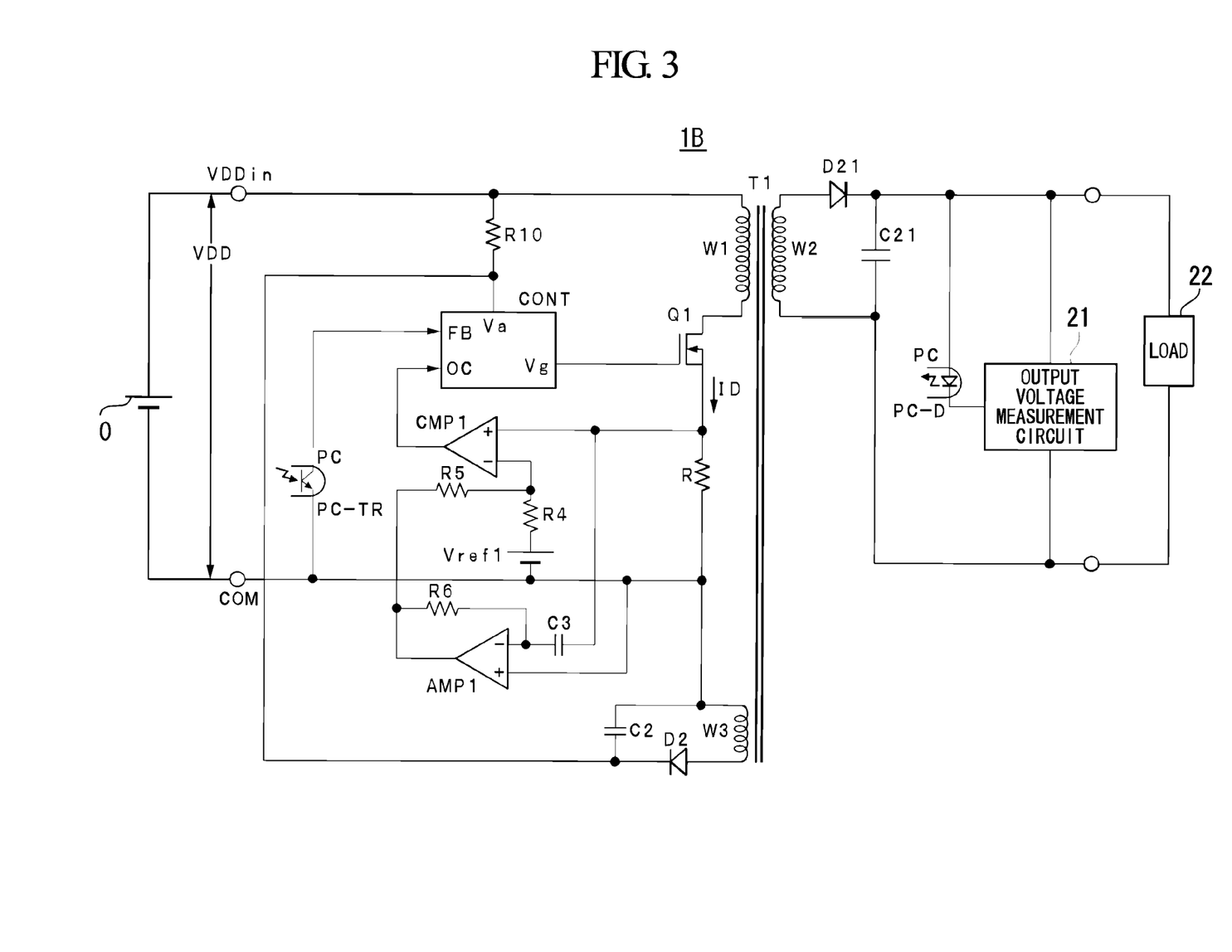
FIG. 3 is a diagram showing the structure of a second embodiment of the switching power supply apparatus in accordance with the present invention.
Figure 4A:
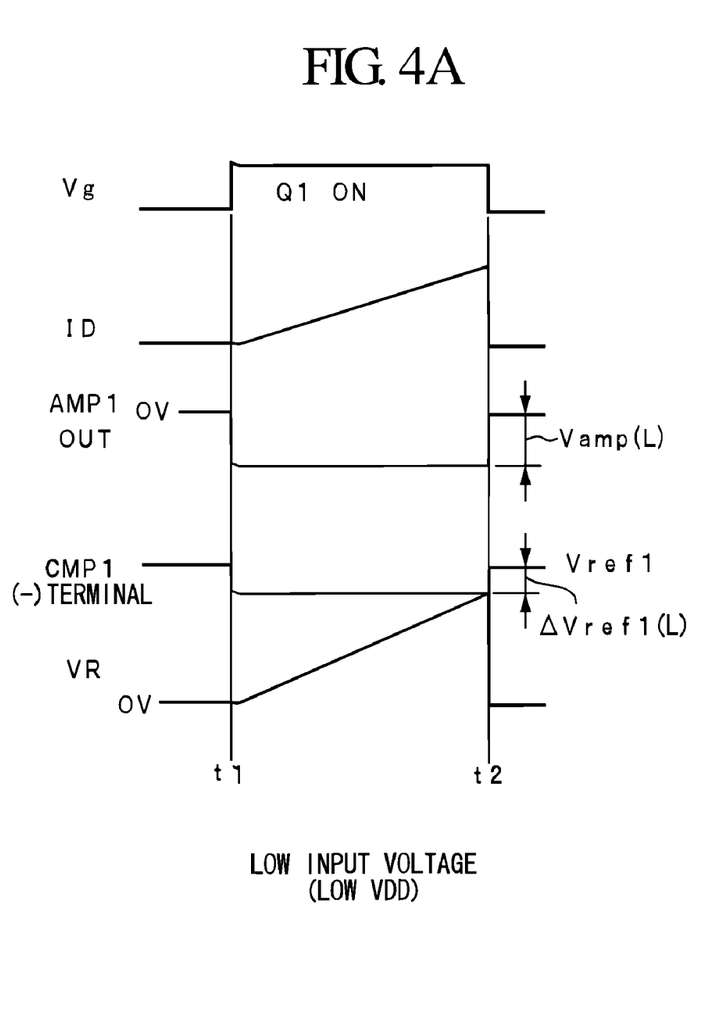
FIGS. 4A and 4B are diagrams for showing the operation of each element of the switching power supply apparatus in the second embodiment.
Figure 4B:
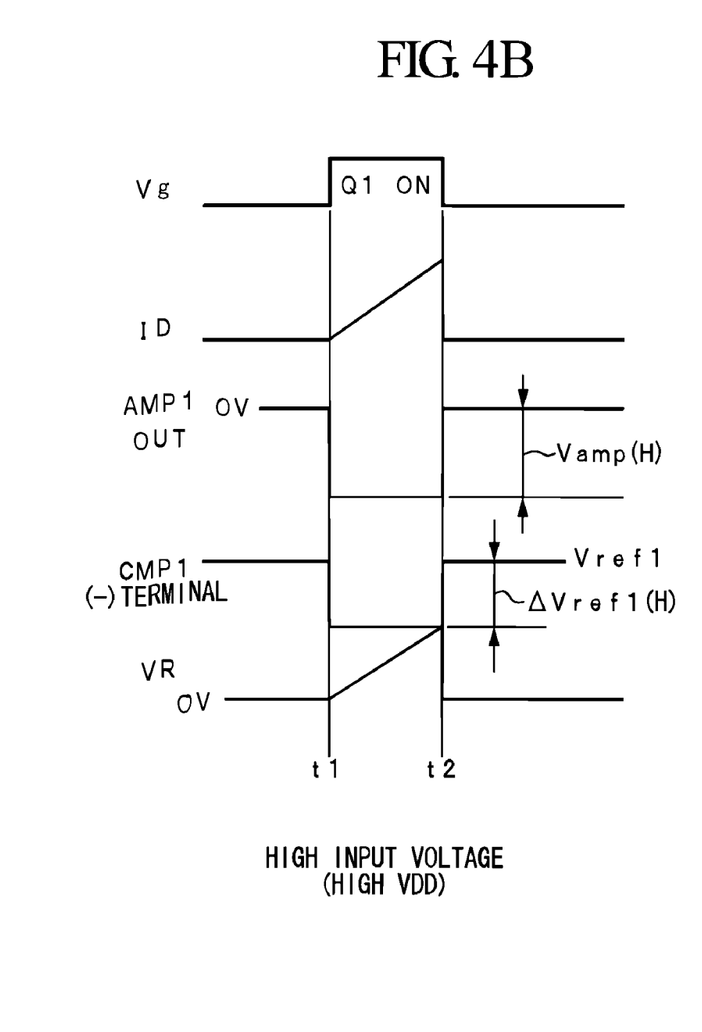

FIG. 3 is a diagram showing a switching power supply apparatus 1B as the second embodiment in accordance with the present invention. In FIG. 3, parts corresponding to those in FIG. 1 are given identical reference numerals. FIGS. 4A and 4B are diagrams for showing the operation of the switching power supply apparatus 1B when the input voltage is high or low. The second embodiment will be explained with reference to these figures.

In the switching power supply apparatus 1B in FIG. 3, the switching current ID is measured as the inter-terminal voltage VR of the current measurement resistor R (VR=R×ID), and the inter-terminal voltage VR is input into the comparator CMP1 for detecting the overcurrent, and an amplifier AMP1.

The comparator CMP1 is provided for detecting the overcurrent. The amplifier AMP, a capacitor C3, and a resistor R6 form a differentiation circuit for detecting the gradient with respect to the waveform of the electric current, and function as a current variation measurement circuit for outputting a specific voltage when the electric current which flows through the switching device Q1 increases at a specific gradient.

An end of the capacitor C3 for the differentiation is connected to an end of the current measurement resistor R, and the other end of the capacitor C3 is connected to the inverting input terminal (−) of the amplifier AMP1. This inverting input terminal (−) and the output terminal of the amplifier AMP1 are connected to each other via the resistor R6. The non-inverting input terminal (+) of the amplifier AMP is connected to the terminal COM of the input power supply. The output terminal of the amplifier AMP1 is connected to the inverting input terminal (−) of the comparator CMP via a resistor R5. In addition, the reference voltage Vref1 is also connected to the inverting input terminal (−) of the comparator CMP1 via a resistor R4.

In accordance with the above structure, when the input voltage VDD increases, the increase rate of the electric current ID increases which flows through the switching device Q1 when the switching device Q1 is active, and the gradient of the inter-terminal voltage of the current measurement resistor R becomes large.

The current flowing through the capacitor C3 is in proportion to the increase rate of the current flowing through the switching device Q1 (i.e., the drain current ID). Therefore, when the above inter-terminal voltage is input via the capacitor C3 into the inverting input terminal of the amplifier AMP1, a negative voltage in proportion to the current is output from the amplifier AMP1.

The reference voltage Vref1 is subjected to voltage division with respect to the negative voltage output from the amplifier AMP1, so that a voltage lower than the reference voltage Vref1 is supplied as a reference voltage for the overcurrent, to the inverting input terminal (−) of the comparator CMP1. Therefore, the higher the input voltage VDD, the higher the increase rate of the drain current, that is, the larger the negative voltage output from the amplifier AMP1. The larger the negative voltage output from the amplifier AMP1, the lower the voltage at the inverting input terminal, which functions as the reference voltage of the comparator CMP1.

For example, at time t1 in FIGS. 4A and 4B, a High-level signal is output from the output terminal Vg of the control circuit CNT, and the switching device Q1 is switched on, so that the current ID begins to flow. Accordingly, a voltage in proportion to the gradient of the current which flows through the switching device Q1 is output from the differential circuit (i.e., AMP1).

As shown in FIG. 4A, when the input voltage VDD is low, the gradient of the current flowing through the switching device Q1 is small; thus, the voltage output from the differential circuit (i.e., AMP1) is a small negative voltage (see "Vamp(L)"). In contrast, as shown in FIG. 4B, when the input voltage VDD is high, the gradient of the current flowing through the switching device Q1 is large; thus, the voltage output from the differential circuit (i.e., AMP1) is a large negative voltage (see "Vamp(H)").

The reference voltage for the overcurrent used in the comparator CMP1 of the overcurrent measurement circuit is determined using the voltage output from the differential circuit (i.e., AMP1) and the reference voltage Vref1. That is, when the gradient of the current ID is small, a voltage obtained by subtracting the lower voltage Vref1(L) from the reference voltage Vref1 is used, and when the gradient of the current ID is large, a voltage obtained by subtracting the higher voltage Vref1(H) from the reference voltage Vref1 is used.

Accordingly, the higher the input voltage VDD, the lower the reference voltage (for detecting the overcurrent) applied to the inverting input terminal of CMP1, thereby allowing the correction of the overcurrent point in accordance with the input voltage VDD.

In the second embodiment shown in FIG. 3, the current variation measurement circuit of the present invention includes the current measurement resistor R, the capacitor C3, the resistor R6, and the amplifier AMP1, and this amplifier AMP1, the resistors R5 and R4, and the reference voltage Vref1 form the overcurrent detection-point correction circuit.

THIRD EMBODIMENT

In the second embodiment, the inter-terminal voltage VR of the current measurement resistor R is differentiated so as to compute a decrease value for decreasing the reference voltage used in the comparator CMP1 for measuring the overcurrent. In the third embodiment of the present invention, in order to reduce an influence of a noise element due to a surge current generated when the switching device Q1 is switched on, a switch SW and a drive circuit therefor are provided for disconnecting the input of the differential circuit so as to make the differential circuit inactive for a specific time period within the time period when the switching device Q1 is on.

Figure 5:
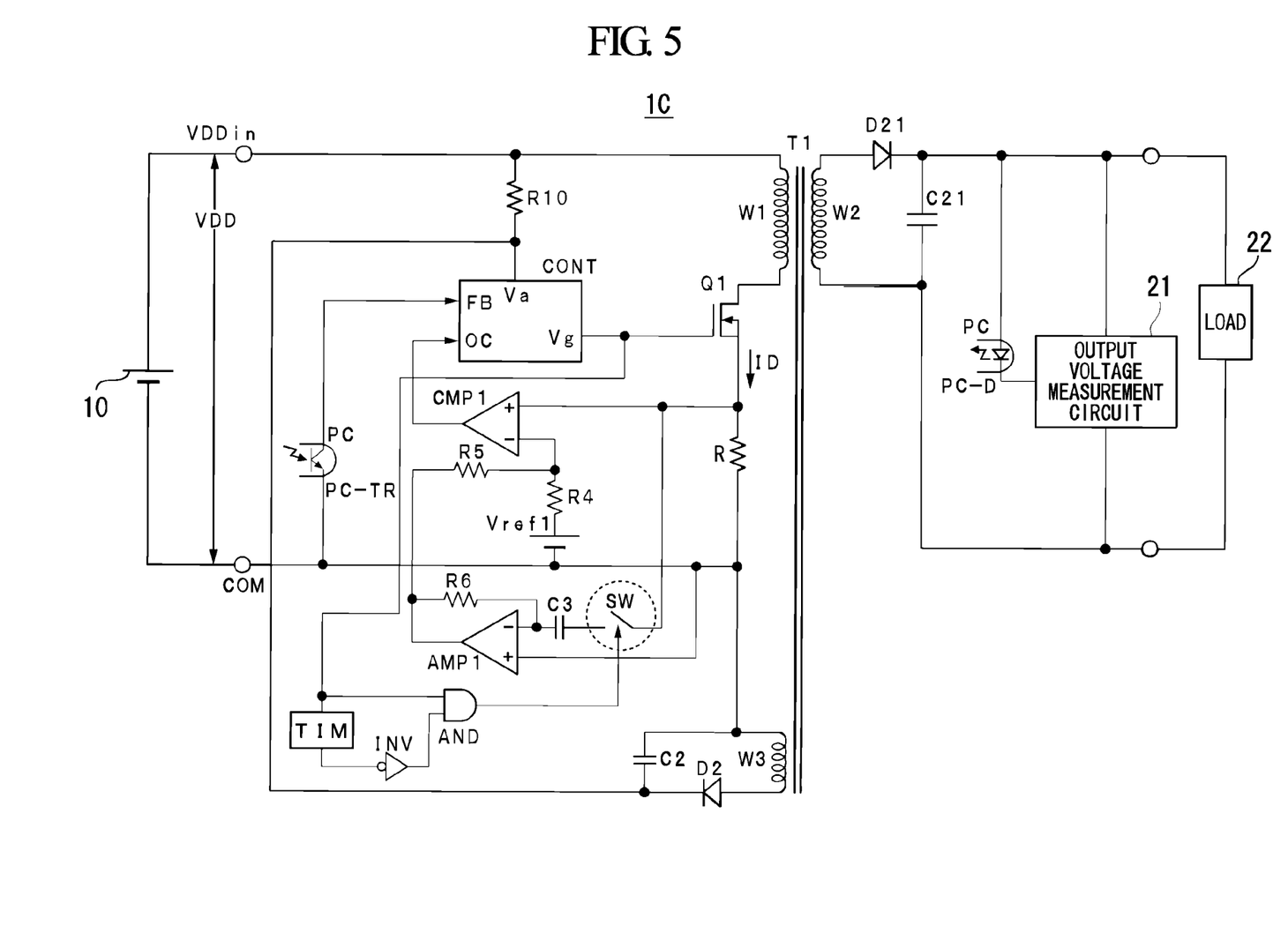
FIG. 5 is a diagram showing the structure of a third embodiment of the switching power supply apparatus in accordance with the present invention.
Figure 6A:
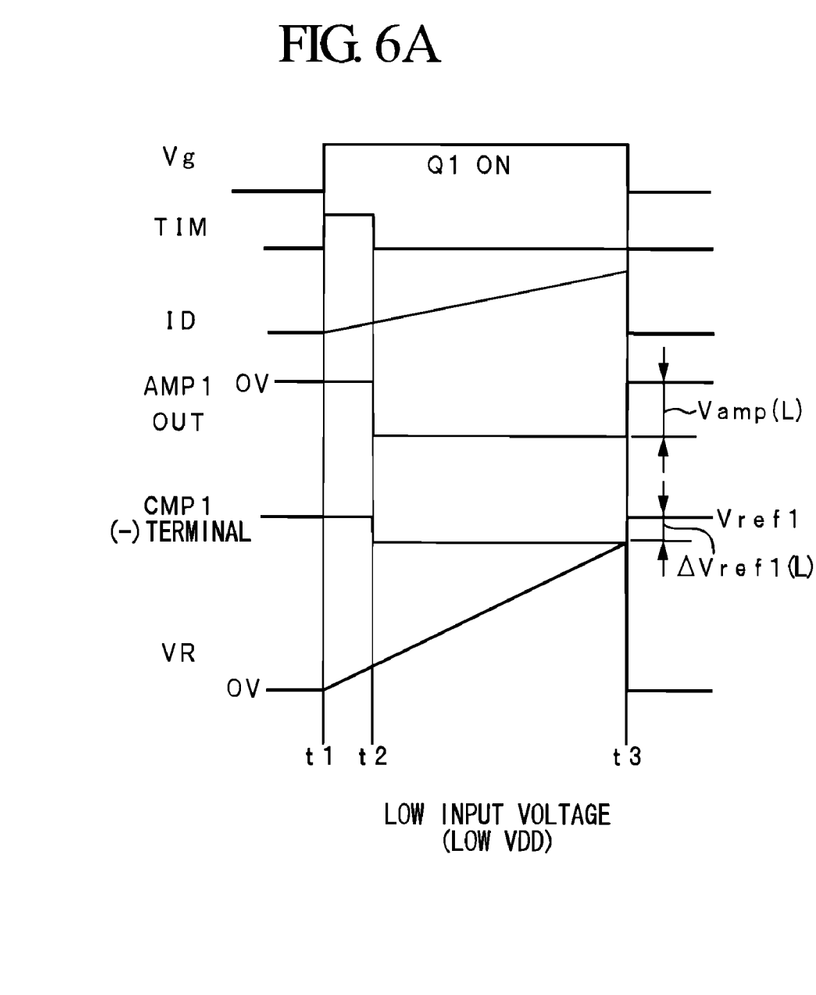
FIGS. 6A and 6B are diagrams for showing the operation of each element of the switching power supply apparatus in the third embodiment.
Figure 6B:
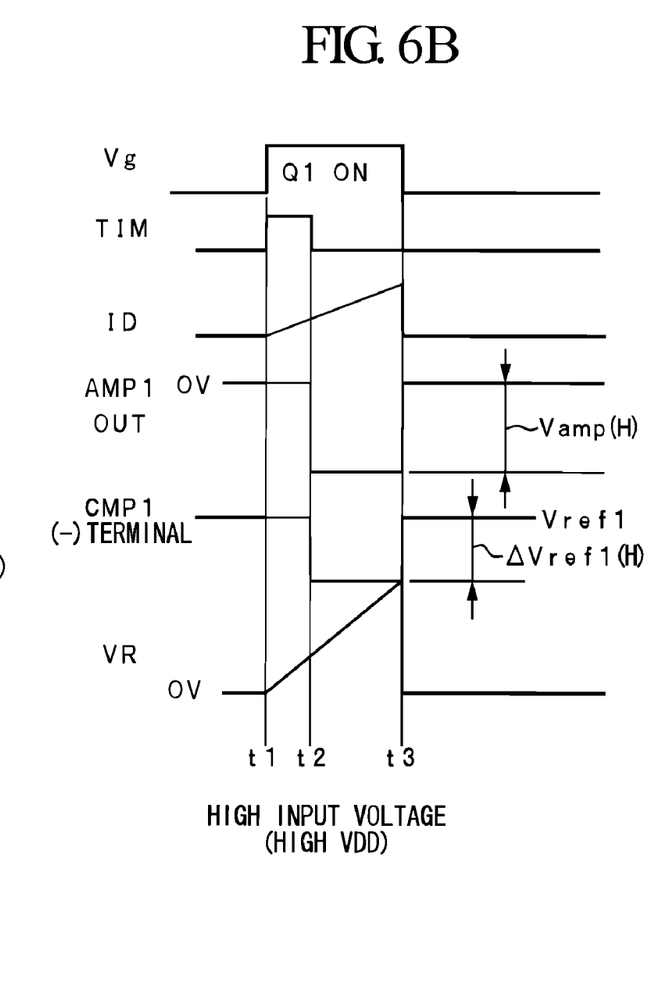

FIG. 5 is a diagram showing a switching power supply apparatus 1C as the third embodiment in accordance with the present invention. In FIG. 5, parts corresponding to those in FIG. 3 are given identical reference numerals. FIGS. 6A and 6B are diagrams for showing the operation of the switching power supply apparatus 1C when the input voltage is high or low. The distinctive features of the third embodiment in comparison with the second embodiment will be explained with reference to these figures.

In the switching power supply apparatus 1C in FIG. 5, the switch SW is provided between the current measurement resistor R and the capacitor C3 as a constituent of the differential circuit. In addition, the output terminal Vg of the control circuit CNT is connected to an input terminal (i.e., one of the two input terminals) of an AND circuit and the input terminal of the timer TIM. The output terminal of the timer TIM is connected via an inverter INV to the other input terminal of the AND circuit. The output terminal of the AND circuit is connected to a control terminal of the switch SW so as to control the ON/OFF operation of the switch SW.

In accordance with the above structure, within a predetermined time period among the period while the ON signal is output from the output terminal Vg of the control circuit CNT to the control terminal of the switching device Q1, the switch SW can be disconnected so as to block noise due to a surge current when the switching device Q1 is switched on, or the like. The above predetermined time period is from when the switching device Q1 is switched on to when a specific time determined by the timer TIM has elapsed.

At time t1 in FIG. 6A, a High-level signal is output from the output terminal Vg of the control circuit CNT, and the switching device Q1 is switched on, so that the current ID begins to flow, and simultaneously, the timer TIM is activated. While the timer TIM operates, no signal is output from the AND circuit, so that the switch SW for the differential circuit is disconnected and no signal is output from the differential circuit.

When the time counting operation of the timer TIM has been completed at time t2, an H-level signal is output from the output terminal of the AND circuit. When the switch SW receives this signal output from the AND circuit, it is activated and the differential circuit (i.e., AMP1) begins to operate. The differential circuit outputs a voltage in proportion to the gradient of the current flowing through the switching device Q1.

As shown in FIG. 6A, when the input voltage VDD is low, the gradient of the current flowing through the switching device Q1 is small; thus, the voltage output from the differential circuit (i.e., AMP1) is a small negative voltage (see "Vamp(L)"). In contrast, as shown in FIG. 6B, when the input voltage VDD is high, the gradient of the current flowing through the switching device Q1 is large; thus, the voltage output from the differential circuit (i.e., AMP1) is a large negative voltage (see "Vamp(H)").

The reference voltage for the overcurrent used in the comparator CMP1 of the overcurrent measurement circuit is determined using the voltage output from the differential circuit (i.e., AMP1) and the reference voltage Vref1. That is, when the gradient of the current ID is small, a voltage obtained by subtracting the lower voltage Vref1(L) from the reference voltage Vref1 is used, and when the gradient of the current ID is large, a voltage obtained by subtracting the higher voltage Vref1(H) from the reference voltage Vref1 is used.

At time t3, the current ID flowing through the switching device Q1 exceeds the reference voltage (for the overcurrent) determined at time t2; thus, the output of the comparator CMP1 is switched form L level to H level, so that an H-level signal is input into the overcurrent input terminal OC of the control circuit CNT. The control circuit CNT then switches the output terminal Vg from H level to L level, thereby disconnecting the switching device Q1.

Accordingly, it is possible to reduce the influence on the differential circuit by a noise element due to a surge electric current generated when the switching device Q1 is switched on.

In the third embodiment shown in FIG. 5, the current variation measurement circuit includes the current measurement resistor R, the switch SW, the capacitor C3, the resistor R6, and the amplifier AMP1, and this amplifier AMP1, the resistors R5 and R4, and the reference voltage Vref1 form the overcurrent detection-point correction circuit.

The embodiments of the present invention have been explained above. In accordance with the above-described structures and operations, the overcurrent detection point can be corrected using the input voltage with respect to the gradient of the switching current, without measuring the input voltage directly or using a winding of the transformer. Therefore, circuit elements which should be added to the control part of the switching power supply apparatus, are (i) the comparator CMP2, the flip-flop FF1, or the like in the first embodiment, or (ii) an amplifier, a small capacitor, and some resistors in the second embodiment. Such elements each can be easily integrated in an integrated circuit, which produces distinctive effects such that the number of external parts of the integrated circuit, and electric power loss can be reduced, and it is unnecessary to add additional terminals for the correction.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the first and the second embodiments relate to an insulating-type switching power supply apparatus in which the current begins to flow through the switching device at the current value of zero. However, the present invention can also be applied to a switching power supply apparatus having a continuous mode, in which the current begins to flow through the switching device even at the current value of non-zero, so as to obtain similar effects.

In addition, the present invention can be applied to a switching power supply apparatus other than an insulating-type switching power supply apparatus in which the primary side and the secondary side are insulated from each other using the primary winding (connected to the input voltage VDD) and the secondary winding (connected to the load) of the transformer. For example, the present invention can also be applied to a booster-type switching power supply apparatus including a power-factor improvement circuit, so as to obtain similar effects.

Additionally, a sample-and-hold circuit may be inserted between the output of the differential circuit and the reference voltage Vref1. In this case, the reference value for detecting the overcurrent is changed only when the input voltage is changed.

The first, second, and third embodiments show circuit examples which perform analog processing. However, a microcomputer having an analog-to-digital converter, or the like, may be used for measuring the gradient of the current ID or performing the differentiation in a digital manner.

Also in the above-described embodiments, the reference voltage for the overcurrent detecting comparator CMP1 is changed using the gradient of the electric current ID. A variable voltage-division circuit may be connected between the current measurement R (for detecting the current ID) and the input of the comparator CMP1, so as to change the voltage-division ratio in accordance with the gradient of the current ID.

INDUSTRIAL APPLICABILITY

In accordance with the present invention, the overcurrent detection point can be corrected with respect to the input voltage, without measuring the input voltage directly or via a winding of the transformer. Accordingly, circuit elements, which should be added to the control part of the switching power supply apparatus, can be easily integrated in an integrated circuit; thus, the number of external parts of the integrated circuit, and electric power loss can be reduced, and it is unnecessary to add additional terminals for the correction to the integrated circuit. Therefore, the present invention can be preferably applied to switching power supply apparatus or the like.

What is claimed is:

1. A switching power supply apparatus comprising:
a transformer having at least a primary winding connected to a direct current power supply, and a secondary winding;
a switching device, connected serially to the primary winding of the transformer, for supplying an electric current from the direct current power supply to the primary winding of the transformer;
a current measurement circuit for measuring an electric current flowing through the switching device;
a rectifying and smoothing circuit connected to the secondary winding of the transformer; and
a switching device control circuit for performing overcurrent protection by controlling switching-on/off of the switching device so as to make a voltage output from the rectifying and smoothing circuit have a specific value, and switching off the switching device when the electric current flowing through the switching device exceeds a value as an overcurrent detection point, wherein
the switching device control circuit includes:
a current variation measurement circuit for measuring a gradient of the electric current flowing through the switching device, based on a current measurement signal output from the current measurement circuit; and
an overcurrent detection-point correction circuit for correcting the overcurrent detection point with respect to the electric current flowing through the switching device, based on a signal output from the current variation measurement circuit.

2. The switching power supply apparatus in accordance with claim 1, wherein the current variation measurement circuit has a device for measuring the gradient of the electric current flowing through the switching device based on a difference between a value of the electric current flowing through the switching device at a first time and a value of the electric current flowing through the switching device at a second time, wherein a specific time period from the first time to the second time is defined within a time period when the switching device control circuit outputs an on-signal to the switching device so as to switch on the switching device.

3. The switching power supply apparatus in accordance with claim 2, wherein:
the current variation measurement circuit has a device for:
determining whether the value of the electric current flowing through the switching device is smaller than a specific reference value when a predetermined time has elapsed after the switching device control circuit begins to output an on-signal to the switching device so as to switch on the switching device, and
outputting a signal for correcting the overcurrent detection point when the value of the electric current is smaller than the specific reference value; and
the overcurrent detection-point correction circuit has a device for increasing a reference value with respect to the overcurrent detection point by a predetermined value when receiving the signal for correcting the overcurrent detection point from the current variation measurement circuit.

4. The switching power supply apparatus in accordance with claim 1, wherein:
the current variation measurement circuit has a device for:
determining whether the value of the electric current flowing through the switching device is smaller than a specific reference value when a predetermined time has elapsed after the switching device control circuit begins to output an on-signal to the switching device so as to switch on the switching device, and
outputting a signal for correcting the overcurrent detection point when the value of the electric current is smaller than the specific reference value; and
the overcurrent detection-point correction circuit has a device for increasing a reference value with respect to the overcurrent detection point by a predetermined value when receiving the signal for correcting the overcurrent detection point from the current variation measurement circuit.

5. The switching power supply apparatus in accordance with claim 1, wherein the current variation measurement circuit has a device for measuring the gradient of the electric current flowing through the switching device by differentiating a waveform of the electric current flowing through the switching device at a time within a time period when the switching device control circuit outputs an on-signal to the switching device so as to switch on the switching device.

6. The switching power supply apparatus in accordance with claim 5, wherein said device for measuring the gradient of the electric current differentiates the waveform of the electric current when a predetermined time has elapsed after the switching device control circuit begins to output an on-signal to the switching device so as to switch on the switching device.

* * * * *